June 11, 1963 G. KIPER 3,093,040
AUTOMATIC CAMERAS
Filed Oct. 28, 1959 3 Sheets-Sheet 1

INVENTOR.
GERD KIPER
BY

June 11, 1963  G. KIPER  3,093,040
AUTOMATIC CAMERAS
Filed Oct. 28, 1959  3 Sheets-Sheet 2

INVENTOR.
GERD KIPER

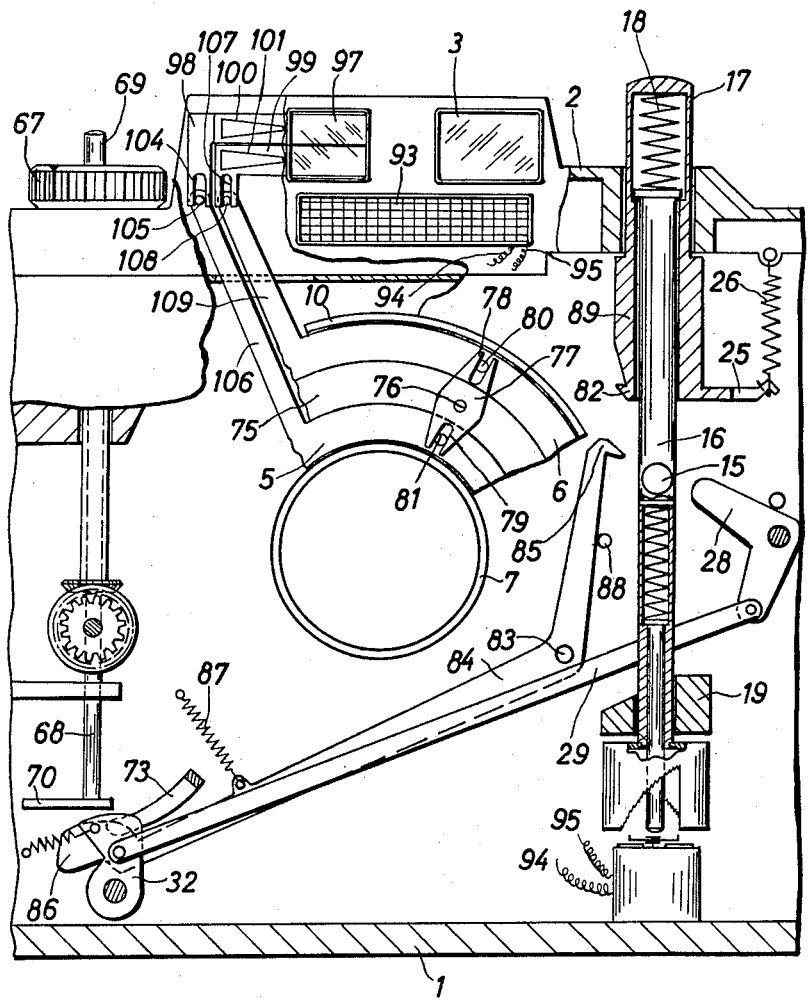

United States Patent Office 3,093,040
Patented June 11, 1963

3,093,040
AUTOMATIC CAMERAS
Gerd Kiper, Unterhaching, near Munich, Germany, assignor to Agfa Aktiengesellschaft, Leverkusen-Bayerwerk, Germany
Filed Oct. 28, 1959, Ser. No. 849,216
Claims priority, application Germany Nov. 5, 1958
22 Claims. (Cl. 95—10)

The present invention relates to cameras.

More particularly, the present invention relates to cameras which are capable of automatically setting factors such as the exposure time and/or exposure aperture.

Although cameras of this type are already known, the known constructions require the user of the camera to set at least one value into the camera according to the prevailing lighting conditions, and this exercise of judgment in order to set the camera according to the lighting conditions is sometimes extremely difficult for the amateur. Moreover, having set the camera and allowed the automatic structure to set factors in addition to that which has been manually set, the user may find that the entire setting of the camera is not conducive to the best possible exposure and may then simply reset the entire camera, which of course nullifies any benefit to be gained by any degree of automatic operation of the camera.

One of the primary objects of the present invention is, therefore, to provide a camera which is very easy to operate so that disadvantages of the type referred to above are avoided.

Another object of the present invention is to provide an automatic camera which only requires the operator to make a selection with respect to the subject in view of the relative importance of the factor of movement or the factor of depth of field. In other words, it is an object of the invention to provide a camera which enables the operator to make a selection according to whether the subject is moving at a rapid rate or whether the sharpness over a relatively large depth of field is of prime importance.

An additional object of the present invention is to provide a camera structure of the above type which enables the operator very easily to change a particular combination of exposure time and exposure aperture to any other exposure time and aperture combination suitable for a given subject under given lighting conditions even after the camera has been actuated to set what the operator considers to be an unfavorable combination of exposure time and exposure aperture into the camera.

It is still another object of the invention to provide a camera which guarantees that an exposure is not made until after the exposure time and exposure aperture have been properly set into the camera in accordance with the prevailing lighting conditions.

The objects of the present invention also include a structure which is relatively simple and which can be very easily operated while requiring a minimum amount of maintenance.

With the above objects in view the invention includes in a camera an objective and a pair of setting rings turnably carried by the objective, these setting rings respectively setting the exposure time and exposure aperture. These setting rings have rest positions where the exposure time and exposure aperture are an extreme value and in accordance with the present invention a differential means cooperates with the setting rings to turn the latter. The differential means is actuated by a manually operable means, and a light-sensitive control means cooperates with the latter manually operable means to determine the extent to which the manually operable means and the differential means therewith are actuated in accordance with the prevailing lighting conditions.

In accordance with the present invention a pair of stop means are provided to cooperate with a pair of setting rings referred to above, and a manually operable selecting means cooperates with the pair of stop means for selectively placing only one of the stop means in a position capable of stopping at least partially the turning of a selected one of the setting rings, so that when the differential is actuated it is only the other of the setting rings which will be turned from its rest position toward a position where it provides the other extreme value of the exposure factor controlled thereby. If the lighting conditions are such that the stopped ring should be turned from its maximum setting after the other ring has been turned to its other extreme setting in order to give a proper exposure, then the stopped ring can be turned since the stop means of the invention are so constructed that they can yield when a predetermined force is applied thereto through the differential means acting on the setting rings, this yieldability being provided by maintaining the stop means in position through a brake structure which can yield when necessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a fragmentary illustration of another embodiment of a structure according to the present invention.

Figure 1:
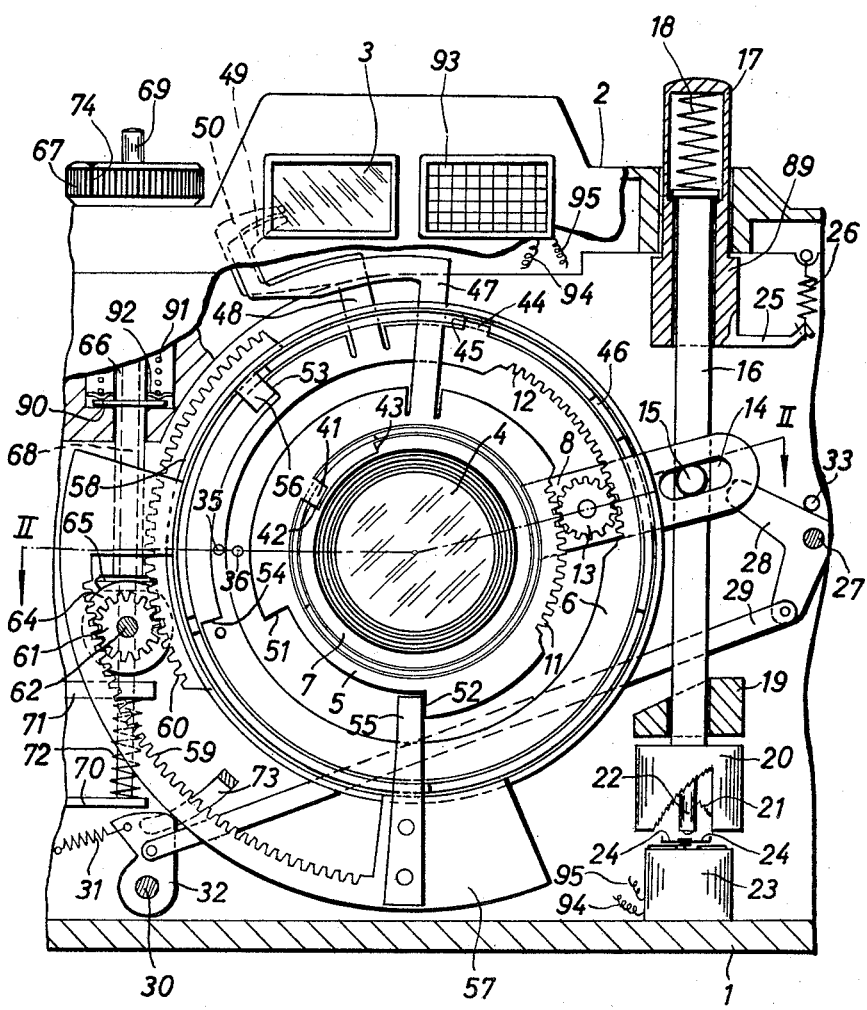
FIG. 1 is a view of a camera as seen from the front thereof with parts of the camera broken away and parts shown in section for the purpose of illustrating as clearly as possible the structure of the invention.
Figure 2:
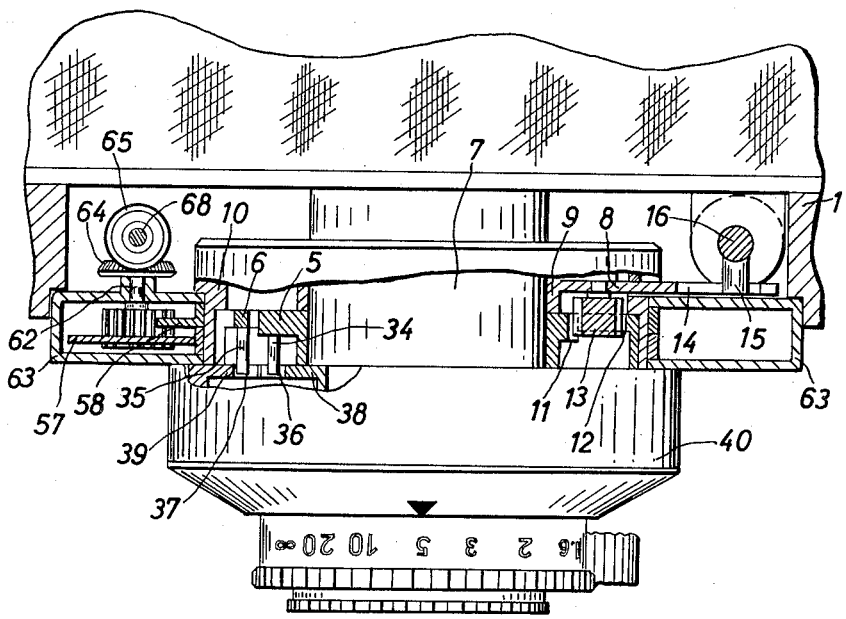
FIG. 2 is a fragmentary sectional plan taken along line II—II of FIG. 1 in the direction of the arrows.
Figure 4:
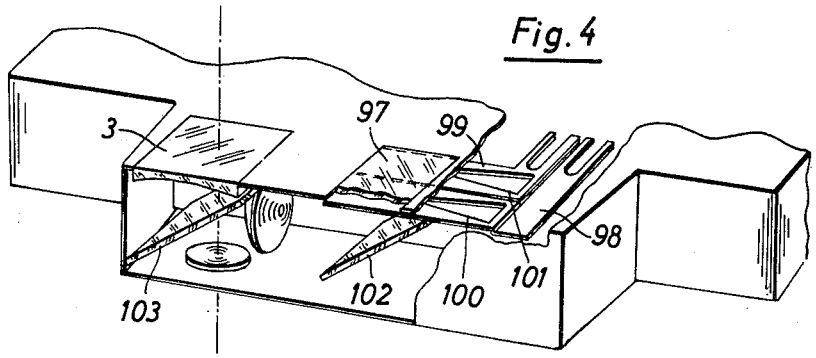
FIG. 4 is a diagrammatic perspective view showing the view-finder.

Referring to the drawings and to FIGS. 1 and 2 in particular, the camera housing 1 illustrated therein includes an upper hollow portion 2 where the viewfinder 3 is located. The objective 4 is carried in a conventional way by the camera housing. The objective 4 includes an inner tube 7 which carries the lenses of the objective, and a pair of setting rings 5 and 6 surround and are turnable with respect to the tube 7 of the objective, these setting rings 5 and 6 respectively setting the exposure aperture and the exposure time in a well known manner. The aperture setting ring 5 is directly turnable on the exterior surface of the lens tube 7, while the exposure time setting ring 6 is turnable on the inner surface of an exterior tube 10 which concentrically surrounds the inner tube 7 and which is fixed to a transverse objective wall which is fixed to both of the tubes 7 and 10 in a well known manner. Thus, the aperture setting ring 5 surrounds the tube 7 which supports the ring 5 for turning movement while the exposure time setting ring is surrounded by the tube 10 which supports the setting ring 6 for rotation, and these rings 5 and 6 have portions located in a common plane which is normal to the optical axis so that the ring 6 surrounds and is spaced from the ring 5. At their portions which are located in a common plane the rings 5 and 6 have toothed peripheral portions 11 and 12, so that the teeth 11 and 12 are located in a common plane normal to the optical axis, and as is particularly apparent from FIG. 1 the aperture setting ring 5 is provided with the teeth 11 while the exposure time setting ring 6 is provided with teeth 12.

A pinion 13 is located between and meshes with the teeth 11 and 12, and this pinion 13 is turnably carried by a lever 8 which is fixed to and extends radially from a ring 9 which surrounds and is turnably carried by the lens tube 7. The lever 8 is formed at its outer free end portion, which extends through a slot in the outer tube 10 to the exterior of the objective assembly, with an axial slot 14 which receives a projection 15 fixed to elongated shaft 16, so that the slot 14 and projection 15 form a pin-and-slot connection between the lever 8 and the shaft 16.

The pinion 13 together with the teeth 11 and 12 and the lever 8 form a differential means for turning the setting rings 5 and 6 in a manner described below for the purpose of setting into the camera a proper combination of exposure time and exposure aperture, and the shaft 16 forms part of a manually operable means which cooperates with the differential means to actuate the latter. This manually operable means includes in addition to the shaft 16 a hollow knob 17 accessible to the operator so as to be directly engaged by the operator. The hollow knob 17 is axially bored so as to receive the upper end portion of the shaft 16, in the manner shown in FIG. 1, and this upper end of the shaft 16 is formed with an outwardly directed flange engaging a shoulder of the knob 17 to limit the extent to which the latter can be moved upwardly with respect to the shaft 16. A spring 18 located within the hollow knob 17 urges the latter upwardly with respect to the shaft 16 to the upper end position of the knob 17 which is illustrated in FIG. 1. The shaft 16 of course guides the knob 17 for movement with respect to the shaft 16 when the spring 18 is compressed beyond the position illustrated in FIG. 1. The knob 17 itself is exteriorly guided by a bearing at the upper portion of the camera, as shown at the upper right of FIG. 1, and the shaft 16 in addition to being guided by the interior of the knob 17 is also guided by a stationary bearing 19 carried by the camera.

The shaft 16 fixedly carries at its lower end a cylinder 20 which is open at its bottom end and which is provided at diametrically opposed portions with a series of teeth 21 extending upwardly along the cylinder 20 in the manner shown in FIG. 1. Also, the bottom end of the shaft 16 is provided with a braking pin 22 in the form of a spring-pressed pin carried by the bottom end portion of the shaft 16. Concentrically mounted in the camera below the shaft 16 and hollow cylinder 20 is a cylindrical housing 23 adapted to enter freely into the interior of the cylinder 20 when the latter moves downwardly around the housing 23 into overlapping relation therewith, and this housing 23 is a galvanometer housing having a rotary coil which has a shaft extending upwardly through the top wall of the housing 23 and carrying over the top wall of the housing 23 a pair of diametrically opposed pointers 24 which form extensions of each other extending across and slightly beyond the housing 23. The upper portion 2 of the camera is provided with a photoelectric cell 93, and this latter cell is connected through the electrical means 94 and 95 with the galvanometer 23 so that the angular position of the rotor of the galvanometer, which is to say the angular position of the pointers 24 will be indicative of the intensity of the light which is received by the photoelectric cell 93. Thus, as the shaft 16 is moved downwardly, the braking pin 22 will first engage the pointers 24, to arrest the latter so that they will remain in the angular position in which they are located due to the intensity of the light received by the photocell 93, and then during the continued downward movement of the shaft 16 the cylinder 20 will surround the housing 23 and will axially overlap the latter to an increasing degree until one tooth of each of the series of teeth 21 engages a pointer 24 both of these pointers 24 being simultaneously engaged by teeth at the same elevation of the two series of teeth 21, so that the forces exerted on the galvanometer by the cylinder 20 are evenly balanced.

It is apparent, therefore, that the extent to which the shaft 16 can be moved axially is determined by the lighting conditions, and therefore the lever 8 which turns in response to axial movement of the shaft 16 will necessarily turn through an angle which is indicative of the lighting conditions.

The manually engageable knob 17 is provided within the interior of the camera with a tubular extension 89, and this extension 89 integrally carries a laterally extending arm 25 connected to one end of a spring 26 whose opposite end is connected to the upper wall of the camera, so that the spring 26 guarantees that the parts return to the illustrated rest position. A bell crank lever 28 is pivotally carried by a stationary pin 27 at a position beneath and in the path of movement of the projection 25, and while the upper arm of the bell crank 28 is in the path of movement of the projection 25, the lower arm of the bell crank 28 is pivotally connected to one end of a link 29 whose opposite end is pivotally connected to a blocking member 32 which is pivotally supported by a stationary pin 30 and which is urged by the spring 31 to the illustrated position. In the position of the parts shown in FIG. 1, the spring 31 urges the blocking member 32 in a counterclockwise direction so as to pull to the left on the link 29 and thus urge the bell crank 28 in a clockwise direction into engagement with the stationary stop pin 33.

As is apparent from FIG. 2, the pair of setting rings 5 and 6 respectively carry fixedly axially extending control pins 34 and 35 which respectively extend into apertures 36 and 37 of a pair of rings 38 and 39 which respectively serve to actuate the diaphragm and the time control. The rings 38 and 39 are conventional and operate in a conventional manner, and they are located within the shutter housig 40 which is located at the front of the camera.

A stop means is provided for limiting the range of turning of the aperture setting ring 5, and this stop means includes a radial projection 41 of the ring 5, this projection 41 (FIG. 1) extending through a slot of the tube 7 into the space between a pair of shoulders 42 and 43 which form part of an interior ring of the tube 7, so that these shoulders 42 nad 43 form a pair of stationary stops located at a predetermined angular distance from each other and cooperating with the projection 41 of the aperture setting ring 5 to limit the extent through which the ring 5 can be turned. The ring 5 is shown in FIG. 1 in its rest position where the projection 41 engages the stop 42, and the ring 5 is yieldably maintained and returned to this rest position by means of the pinion 13, the lever 8, the shaft 16, the knob 17 and the spring 26. In its rest position where the stop 41 engages the stop 42, the ring 5 provides the maximum aperture, and as the ring 5 turns in a clockwise direction, as viewed in FIG. 1, it acts through the pin 34 and ring 38 on the diaphragm leaves in a known way to gradually decrease the size of the exposure aperture until the projection 41 engages the stop shoulder 43, at which time the diaphragm aperture is at its smallest possible size.

In much the same way a stop means is provided to limit the range through which the exposure time setting ring 6 can turn, and for this purpose the ring 6 is provided with a radial projection 44 which extends into the space between stops 45 and 46, these stops 45 and 46 being formed by the ends of a slot of the tube 10 into which the projection 44 extends, so that the slot ends 45 and 46 cooperate with the projection 44 to limit the range through which the ring 6 can turn. The exposure time setting ring 6 is also shown in FIG. 1 in its rest position where the stop projection 44 engages the stop 45, and the spring 26 is in the same way as above described operatively connected with the ring 6 to yieldably maintain the latter in the rest position thereof shown in FIG. 1 and to return the ring 6 to its rest position shown in FIG. 1, the exposure time being at a maximum value when the ring 6 is in its rest position, and of course, this exposure time will become gradually smaller as the ring 6 turns in a clockwise direction until the projection 44 engages the stop 46, at which time the exposure time will have its minimum value. The rings 38, 39, for controlling the exposure aperture and the exposure time however may be arranged in a manner that in the rest position of the rings 5, 6 indicated in FIG. 1 the minimum value of the exposure aperture and the minimum value of the exposure time are set.

An indicating means is provided for indicating to the operator the angular positions of the rings 5 and 6, and this indicating means takes the form of an angular arm 47 fixed to the ring 5, extending radially therefrom through an arcuate slot in the tube 10 to the exterior of the latter, having at the exterior of the tube 10 an arcuate portion extending to the left from the radial portion, as viewed in FIG. 1, and this arcuate portion then again extends radially and finally circumferentially in the opposite direction so that the arm 47 has a free end portion 49. In the same way the indicator which cooperates with the ring 6 is in the form of an angular arm 48 having a portion extending radially from the ring 6 through an arcuate slot of the tube 10 to the exterior of the latter, and this angular arm 48 is of the same general configuration as the arm 47 and terminates in a free end portion 50 which is offset with respect to the free end portion 49 so that the operator can readily distinguish between the free end portions 49 and 50. These free end portions 49 and 50 extend into the field of the viewfinder, the free portions 49 and 50 being positioned behind the window of the viewfinder, and depending upon the angular positions of the rings 5 and 6 the free end portions 49 and 50 will extend to a greater or lesser degree into the field of vision of the viewfinder. The free end portion 49 of the arm 47 forms a symbol which indicates to the operator of the camera whether or not the camera is set for a relatively large depth of field, while the end portion 50 indicates to the operator whether or not the camera is set for a relatively fast moving subject. As is well known, as the exposure aperture decreases in size the range of distances over which a sharp photograph will be made continuously increases, so that with relatively small exposure apertures a relatively large depth of field will provide sharp images to be photographed. Also, as is well known at relatively small exposure times fast moving objects can be photographed without producing blurring. Thus, depending upon the particular subject the operator will consider the factor of the movement of the subject or the depth of field as being of primary importance, and by noting in the viewfinder whether the projection 50 extends well into the field of vision beyond the projection 49 or whether the projection 49 extends well beyond the projection 50 the operator knows whether the camera settings are proper for a subject which is moving quickly or for a subject where sharpness over the largest possible depth of field is important.

In accordance with the present invention a pair of stop means are provided and cooperate with the pair of setting rings 5 and 6 to stop the turning thereof by the differential means 8, 13, and this pair of stop means is actuated by a manually operable selecting means for selectively placing one or the other of these stop means in an operating position with respect to the rings 5 and 6 so as to prevent either the ring 5 or the ring 6 from being turned during actuation of the differential means by the manually operable means 16, 17. The structure of the invention is such that when the ring 5 or 6 which is not prevented from turning reaches the end of its possible movement the stop means which cooperates with the other ring is capable of yielding to then permit the other exposure determining factor to diminish.

This structure which includes the pair of stop means and the manually operable selecting means will now be described.

Thus, the aperture setting ring 5 is provided with an arcuate cutout at its periphery, this arcuate cutout terminating in a pair of shoulders 51 and 52 which form a pair of stops, and a stop projection 55 of a gear sector 57 extends into the space between the stops 51 and 52, which is to say into the arcuate cutout at the periphery of the ring 5. The stop projection 55 is fixed to the gear sector 57 and the gear sector 57 itself forms part of a ring surrounding and turnably carried by the exterior tube 10 of the objective, the projection 55 extending through a slot formed in the tube 10. The gear sector 57 is provided with internal teeth 59.

The second stop means is in the form of an arcuate cutout formed in the outer periphery of the exposure time setting ring 6 and terminating at the shoulders 53 and 54 of the ring 6, a stop projection 56 extending into the arcuate cutout between the stop portions 53 and 54. The stop projection 56 also extends through an arcuate slot formed in the exterior tube 10, and this projection 56 is fixed to a ring which is turnable on the tube 10 and which is provided with the gear sector 60. The gear sector 60 is located in the same plane as the teeth 59, and the two gear sectors together with their stop projections 55 and 56 and together with the stop shoulders 51, 52, on the one hand, and 53, 54, on the other hand, form the pair of stop means which respectively cooperate with the rings 5 and 6.

The manually operable selecting means which cooperates with this pair of stop means for simultaneously moving the latter at all times in equal and opposite directions includes a pinion 61 located between and meshing with the teeth 59 and 60. The pinion 61 is fixedly carried by a shaft 62 which is supported for turning movement by a bearing carried by the annular housing 63 in which the gear sectors 57 and 58 and the rings which carry the latter are located, as is particularly apparent from FIG. 2, this annular housing 63 being located at the front wall of the camera 1. The shaft 62 is fixed at its rear end to a first bevel gear 64 which meshes with a second bevel gear 65, and this second bevel gear 65 is fixed to an elongated member 66 in the form of an axially bored shaft. The elongated member 66 extends from the bevel gear 65 upwardly along the interior of the camera and through the top thereof, and at its top end the elongated member 66 is fixed to a knob 67 which is capable of being manually turned so as to rotate the member 66 and the bevel gears and thus turn the pinion 61 for the purpose of moving the pair of stop means in opposite directions around the optical axis at the will of the operator. The knob 67 is provided with an index 74 capable of being aligned with a pair of marks on the top wall of the camera, these marks being angularly spaced from each other and being in the form of arrows or the like. These marks or arrows show the direction in which the knob 67 should be turned for the purpose of photographing a fast moving subject or for the purpose of providing sharpness over the largest possible depth of field. Thus, the operator will turn the knob 67 in one direction to photograph a fast moving object and in the opposite direction for providing sharpness over the largest possible depth of field.

A brake means is provided to determine the force which must be provided to move a stop means, and this brake means includes an annular ring 90 fixed to the tube 66 and engaged by a ring 92 which is urged against the ring 90 by a spring 91 coiled around the hollow shaft 66 and engaging an upper stationary portion of the camera. If desired a nut may be threadedly carried by the camera freely surrounding without necessarily engaging the shaft 66 and the top end of the spring 91 can bear against this nut so that by turning the nut with respect to the camera housing it is possible to control the compression of the spring 91 and thus control the force with which the brake ring 92 bears against the ring 90. The pressure of the ring 92 against the ring 90 will maintain the shaft 66 and the parts connected thereto stationary until acted upon by a force sufficient enough to overcome the friction between the brake elements 92 and 90.

An elongated shutter release rod 68 extends axially through the hollow shaft 66, and this shutter release rod 68 has an upper free end portion 69 located at an elevation higher than the knob 67 so as to be accessible to the operator. The bottom end of the rod 68 is fixed to an arm 70 which is located directly over the blocking member 32, so that as long as the blocking member 32 remains in the position illustrated in FIG. 1 the member 70 and the rod 68 cannot be moved downwardly beyond the position shown in FIG. 1 and thus the shutter cannot be released. The rod 68 is guided through an opening in a stationary member 71 of the camera, and a tension spring is coiled around the rod 68 beneath the member 71, the top end of this spring being fixed to the member 71 and the bottom end of the spring being fixed to the member 70 so that the spring 72 pulls the member 70 and the rod 68 upwardly to the idle position thereof illustrated in FIG. 1. In order to release the shutter the operator depresses the rod by engaging the upper portion 69 thereof in opposition to the spring 72, and this spring will return the rod 68 to the illustrated rest position thereof. The shutter is released when a lever 73 is turned by member 70 in a counterclockwise direction around the optical axis, and this lever 73 has its left free end, as viewed in FIG. 1, located beneath the member 70 but an elevation lower than the top end of the blocking member 32, so that the member 70 cannot engage and turn the shutter release member 73 until the blocking member 32 has been turned out of the path of movement of the member 70.

When making an exposure with the structure described above and shown in FIGS. 1 and 2, the operator will first determine whether sharpness over the largest possible depth of field or whether the speed of movement of the subject is most important, and depending upon this choice the knob 67 will be placed in an angular position where the index 74 is located in alignment with that mark which indicates setting for depth of field or setting for speed of movement. In the position of the parts shown in FIG. 1 a selection has been made for an exposure of a fast moving subject so that the combination of exposure time and exposure aperture which will be made with the setting illustrated in FIG. 1 will be made with a view to the photographing of a subject which is moving rapidly.

Thus, after the selecting means has been actuated by turning the knob 67, the operator will depress the plunger 17. It should be remembered that in the rest position of the parts the rings 5 and 6 are maintained at the positions where they provide the maximum aperture and exposure time values. The turning of the knob 67 by the operator in order to make a selection from the viewpoint of speed of movement or depth of field only provides turning of the gear sectors 57 and 58 in opposite directions so as to place either the stop projection 55 or the stop projection 56 in an operating position. Since with the example shown in FIG. 1 the selection has been made from the point of view of a fast moving object, it is the stop projection 55 which has been placed in an operating position since it is this stop projection which cooperates with the aperture setting ring 5. When operating the camera so as to make the best possible exposure of a rapidly moving subject, it is of course, desired to have the smallest possible exposure time which the lighting conditions will permit. Therefore, the desire is to set the pair of stop means by the selecting means in a position which will prevent turning of the aperture adjusting ring 5 so that the aperture will remain at its maximum value while the exposure time setting ring 6 is turned to constantly reduce the exposure time.

During the depression of the plunger 17 and the shaft 16 therewith since the spring 18 does not become compressed until the shaft 16 stops its downward movement, the cylinder 20 passes downwardly over the galvanometer housing 23 until the pointers 24 engage the teeth 21 to stop the downward movement at a predetermined elevation indicative of the lighting conditions, as was pointed out above, and thus during this time the lever 8 turns in a clockwise direction, as viewed in FIG. 1, through an angle determined by the particular lighting conditions. It will be noted that the stop 55 because of its location next to the shoulder 52 prevents the ring 5 from turning in a clockwise direction, as viewed in FIG. 1, so that the aperture remains at its maximum value, and since the ring 5 and the teeth 11 therewith cannot turn during the downward turning of arm 8, the pinion 13 rides along the teeth 11 and cooperates with the teeth 12 to turn the ring 6 in a clockwise direction so as to reduce the exposure time. During this turning of the ring 6 the stop shoulder 54 thereof approaches the stop projection 56 which of course does not in any way prevent the turning of the ring 6 at this time.

Assuming that the lighting conditions are such that the brightness of the subject being photographed is relatively small, then only the exposure time would be regulated while the aperture would remain at its maximum size. However, if the conditions are such that a large amount of light is available then when the stop projection 44 reaches the stop 46 so that the exposure time cannot be reduced further, it may happen that there is still too much light and an over exposure will be made unless the aperture size is reduced. In this event the teeth 21 will not yet have engaged the pointers 24 by the time the lever 8 has been turned through an angle which places the stop projection 44 in engagement with the stop projection 46, and thus the shaft 16 will continue to move downwardly with the result that the lever 8 is moved downwardly beyond the position it takes when the projection 44 engages the stop 46. Upon engagement of the projection 44 with the stop 46 it is clear that the ring 6 cannot turn further, and thus at this time the gear 13 rides along the teeth 12 of the ring 6 and turns the ring 5 in a clockwise direction, as viewed in FIG. 1. Of course, this turning of the ring 5 at this time is accompanied by pushing of the stop projection 55 by the shoulder 52 and the gear sector 57 turns so as to turn pinion 61 and the pair of bevel gears 64 and 65 in opposition to the force of the brake 90, 92. The parts are so designed that the spring 18 will not yield and will reliably transmit downward movement of the plunger 17 to the shaft 16 to continue downward movement of this shaft and clockwise turning of the lever 8, as viewed in FIG. 1, beyond the point where the projection 44 engages the stop 46 while moving the gear sector 57 in opposition to the brake 90, 92 until the teeth 21 engage the pointers 24 so that the proper combination of exposure time and exposure aperture is provided, this combination including the smallest exposure time with the proper aperture in the example given above.

The angular distance between the shoulders 51 and 52 of the ring 5 is equal to the angular distance between the shoulders 53 and 54 of the ring 6 and both of these angular distances are equal to the sum of the angular distances between the stops 45 and 46 on the one hand, and the stops 42 and 43, on the other hand, so that the distance between the stop projections 51 and 52 of the ring 5 and the stop shoulders 53 and 54 of the ring 6 is equal to the total angle through which both of the rings 5 and 6 are capable of turning, and thus both of the stop means which are actuated by the manually operable selecting means are capable of accommodating the full range of turning of both of the rings 5 and 6.

In the example described above, the projection 50 will have extended into the field of the viewfinder well beyond the projection 49 so that the operator will know that the camera is operating properly to provide the best possible exposure for a fast moving subject.

It should be noted that with the structure of the invention the operator is not bound by his first choice in the turning of the knob 67. Thus, assume for example that after the plunger 17 has been depressed the operator decides that while the speed of movement of the subject was important nevertheless sharpness over a fairly large depth of field is also of considerable importance, then the operator can still turn the knob 67 to an intermediate position, for example, and this will simply result in turning of the pinion 61 so as to move the gear sectors 57 and 58 in opposite directions with the result that a different combination of exposure time and exposure aperture will introduce into the camera, but this combination will still be proper for the particular lighting conditions. Thus, in the above example if the operator decides after depression of the plunger 17 and engagement of the teeth 21 with pointers 24 to reset the knob 67, then the result may be that the turning of the pair of stop means will cause the stop projection 56 to engage the shoulder 54 and turn the exposure time setting ring 6 back to a value greater than its lowest possible value, and since the lever 8 is stationary at this time the axis of the pinion 13 is also stationary and the ring 6 which now turns in a counterclockwise direction, as viewed in FIG. 1, acts through the pinion 13 on the teeth 11 of the ring 5 to set the exposure aperture at a value which is proper for the new exposure time under the given lighting conditions.

Although the above-described example has been made with a setting from the point of view of a rapidly moving object, the structure operates equally well according to the same principle where the knob 67 has been moved to a position for giving the sharpness over the largest possible depth of field. Thus, in this latter case the stop projection 56 will be located next to the shoulder 54 of the ring 6 and the stop projection 55 will be located next to the shoulder 51 of the ring 5, so that the latter is free to turn while the stop projection 56 prevents turning of the ring 6, and thus at this time the clockwise movement of the lever 8 will result in clockwise turning of the ring 5 so as to reduce the aperture size while the exposure time remains at its largest value, and of course, in the same way if the lighting conditions are such that the exposure time also is required to be reduced when the aperture is at its smallest size, then the differential means will overcome the force of the brake means 90, 92 to permit the ring 6 to act through the shoulder 54 on the stop projection 56 to push the latter while the exposure time is reduced. Also, in this case if, after the teeth 21 of the cylinder 20 engage the pointers 24 so that the position of the lever 8 is determined in accordance with the lighting conditions and the operator decides to change his choice of the angular setting of the knob 67, then the turning of the knob 67 while the lever 8 remains stationary results in turning back of the aperture setting ring 5 by engagement of the stop 55 with the projection 52 to turn the aperture setting ring 5 in a counterclockwise direction, as viewed in FIG. 1, and at this time the teeth 11 will act through the pinion 13 on the teeth 12 to decrease the exposure time while the exposure aperture is increasing, and thus with the structure of the invention the operator is not at all bound to his preselection and can at any time make another selection entirely independent of the preselection and giving all of the possible proper combinations of exposure time and exposure aperture for the given lighting conditions.

Once the shaft 16 has reached the end of its downward movement upon engagement of the teeth 21 with the pointers 24, the continued downward movement of the plunger 17 will compress the spring 18 and will result in movement of the plunger 17 independently of the shaft 16 so as to place the projection 25 in engagement with the upper end of the bell crank 28. As a result this bell crank 28 will be turned in a counterclockwise direction, as viewed in FIG. 1, so as to move the link 29 to the right and thus turn the blocking member 32 in a clockwise direction out of the path of downward movement of the member 70. Now the operator can depress the rod 68 so as to release the shutter and make the exposure. Upon release of the rod 68 the spring 72 returns it to its rest position, and upon release of the plunger 17 the spring 26 can return the plunger 17 and shaft 16 to their rest position and the spring 31 returns the blocking member 32 together with the link 29 and bell crank 28 to their rest position as soon as the spring 72 has moved member 70 upwardly beyond the blocking member 32 after the exposure has been made.

In the embodiment of the invention which is illustrated in FIG. 3, all of the parts which are the same as that of the embodiment of FIG. 1 are indicated with the same reference characters. In the embodiment of FIG. 3 the exterior surface of the lens tube 7 of the objective also turnably carries the aperture adjusting ring 5. In the same way, the exposure time setting ring 6 is turnably carried by the inner surface of the exterior tube 10 of the objective. In the embodiment of FIG. 3 a third ring is turnably carried by the inner surface of the tube 10, and this third ring has an axially extending annular projection 75 located between the rings 5 and 6. Of course, if desired, the third ring can be carried by the exterior of the tube 7 and can still have at its outer periphery in this case an axially extending annular projection 75 extending into the space between the rings 5 and 6. The end faces of the rings 5, 6 and 75 shown in FIG. 3 are located in a common plane normal to the optical axis, and the face of the ring 75 visible in FIG. 3 fixedly carries a pivot pin 76 on which a lever 77 is pivotally mounted, and this lever 77 has free end portions respectively overlapping the rings 5 and respectively formed with the elongated slots 78 and 79 in which the pins 80 and 81 are respectively located, these pins 80 and 81 respectively being fixed to the rings 6 and 5. Thus, these slots and pins form pin-and-slot connections between the lever 77 and the rings 5 and 6 so that with this construction also a differential means is provided for actuating the rings 5 and 6. Thus, if the selecting knob 67 is placed in a position which will maintain the aperture adjusting ring 5 stationary, then when the ring 75 is turned the pin 81 will remain stationary and the lever 77 will turn around the pin 81 so as to move the ring 6 in a clockwise direction to reduce the exposure time, and in the same way when the ring 6 is maintained stationary upon the opposite selection made by the knob 67, the pin 80 will remain stationary and during clockwise turning of the ring 75 the lever 77 will turn so as to move the ring 5 in a clockwise direction in order to reduce the exposure aperture. The ring 75 is connected to the arm 8 in the same way as the ring 9 described above, and this arm 8 cooperates in the same way with the projection 15 of the shaft 16 shown in FIG. 3.

Of course, if desired, the slots can be formed in the rings 5 and 6 and the lever 77 can carry pins which respectively extend into these slots.

The shaft 16 of the embodiment of FIG. 3 is identical with that of FIG. 1 and operates in the same way and cooperates with the same elements. However, with the embodiment of FIG. 3 the tubular projection 89 of the plunger 17 is provided with a tooth 82. This tooth 82 cooperates with a pawl 84 turnably carried by a stationary pin 83 for turning movement, and a spring 87 cooperates with the pawl 84 to hold the pawl 84 against the stop pin 88 which is a stationary pin carried by the camera. With the embodiment of FIG. 3, during the downward movement of the plunger 17 the projection 75 will act on the bell crank 78 in the same way as described above to move the blocking member 32 out of the path of downward movement of the member 70 so that the latter can cooperate with the shutter release 73 is order to release the shutter upon downward movement of the rod 68. However, with this embodiment when the plunger 17 has been moved downwardly sufficiently the tooth 82 will cooperate with the end 85 of the pawl 84 in a manner which will enable the pawl 84 to retain the plunger 17 in its depressed position, and this will of course enable the plunger 17 to act through the spring 18 on the shaft 16 to maintain the latter in its lowermost position determined by the particular lighting conditions, so that with the embodiment of FIG. 3 should the operator decide to make a second choice of the angular position of the knob 67 after actuation of the plunger 17, this plunger 17 will be maintained in its depressed position without any particular attention being paid to the maintenance of the plunger 17 in its depressed position by the operator, since with the embodiment of FIG. 3 this will be done automatically through the pawl 84 cooperating with the tooth 82. Of course, if desired, the embodiment of FIG. 1 may be provided with a similar pawl arrangement for maintaining the plunger 17 in its depressed position so that the operator need not think of maintaining the plunger 17 depressed while making another selection of the angular position of the knobs 67.

The left free end of the lever 84 is provided with a camming projection 86 which is located beneath the member 70 but at an elevation lower than the shutter release 73. Thus, upon depressing the plunger 17, the projection 25 thereof will act through the bell crank 28 and link 29 on the blocking member 32 to move the latter out of the path of the member 70 and at the same time the pawl 84 will cooperate with the tooth 82 to maintain the plunger 17 in its depressed position. Now the rod 68 may be actuated in order to release the plunger, and during the downward movement of the member 70 the element 73 will first be actuated to release the shutter so as to make the exposure, and then during the continued downward movement of the member 70 it will engage the camming projection 86 so as to turn the lever 84 in opposition to the spring 87 and release the pawl 85 from the tooth 82 so that the spring 18 can now return the plunger 17 to its illustrated position with respect to the shaft 16, the spring 26 operating to return the parts upwardly to their rest position shown in FIG. 3, in the same way as was described above as was described in connection with FIG. 1.

Of course, during downward movement of the shaft 16 of FIG. 3, the pin 15 thereof will cooperate with the slot of the arm 8 which is not shown in FIG. 3 for the sake of clarity in order to turn the ring 75, and depending upon the setting of the knob 67 one or the other of the rings 5 and 6 will be held stationary so that the clockwise turning of the ring 75 will result in a reduction of the exposure time or a reduction of the exposure aperture in the manner described above, the differential structure of FIG. 3 operating in the same way as the differential means of FIG. 1.

All of the structure which is not shown in FIG. 3 is identical with that of FIG. 1.

It should be noted that the invention is not necessarily limited to the above-described details. For example, the manually operable selecting means can have instead of the gear teeth 59 and 60 and a pinion 61 arcuate friction surfaces and a friction wheel cooperating therewith, or a lever on shaft 62 connected by pin-and-slot means with the sectors 57, 58. Furthermore, the symbols 49 and 50 need not be located directly in the field of vision of the viewfinder and can instead be located beside the viewfinder and reflected into the field of vision of the viewfinder by a suitable optical structure. In this case a second window 97 would be provided adjacent to the viewfinder and masking plates 98, 99 with slots 100, 101 forming symbols would be located behind this second window and the reflection of the images of the slots 100, 101 into the viewfinder can take place by means of a fully reflecting element 102 located behind the masking plates 98, 99 and the second window 97 at an angle suitable for directing images thereof toward the viewfinder, and in the viewfinder itself a semi-transparent reflecting element 103 can be provided for directing the images which it receives of the slots 100, 101 along the viewfinder axis so as to provide images of slots 100, 101 in this way. The masking plate 98 is connected by pin and slot means 104, 105 with an arm 106 of the ring 5 and the masking plate 99 is connected by pin and slot means 107, 108 with an arm 109 of the ring 6.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, objective means; an exposure time setting ring turnably carried by said objective means and having a rest position where the exposure time is at an extreme value; an aperture setting ring turnably carried by said objective means and having a rest position where the aperture is at an extreme value; differential means cooperating with said rings for turning the latter to set the exposure time and aperture of the camera, said differential means also having a predetermined rest position; means cooperating with said setting rings and said differential means for automatically returning said setting rings and said differential means to said rest positions thereof after each exposure; light-sensitive means cooperating with said differential means for controlling the extent of operation thereof; and manually operable means cooperating with said rings for selectively preventing movement of one of said rings from said rest position thereof at least over a predetermined range until the other of said rings has been moved by said differential means through its entire range of movement.

2. In a camera, in combination, objective means; a pair of setting rings turnably carried by said objective means for respectively setting the exposure time and exposure aperture, both of said rings having rest positions where said exposure time and exposure aperture are at an extreme value; a pair of stop means respectively cooperating with said rings for stopping the movement thereof from said rest positions, respectively, until a given force is applied to said pair of stop means; differential means cooperating with said rings for turning the latter from said rest positions thereof, said differential means also having a rest position; means cooperating with said setting rings and said differential means for automatically returning said rings and said differential means to said rest positions thereof after each exposure; light-sensitive means cooperating with said differential means for controlling the extent of operation thereof; and manually operable means cooperating with said pair of stop means for selectively placing only one of said stop means in an operating position to prevent movement of a selected one of said rings by said differential means so that the exposure factor set by the other of said rings will be changed upon actuation of said differential means from its one extreme value to its other extreme value before said differential means will apply to said one ring said predetermined force to move said one ring from its rest position in opposition to the selected stop means which cooperates with said one ring.

3. In a camera, in combination, an objective; a pair of rings turnably carried by said objective for setting the exposure time and the exposure aperture, respectively, said rings respectively having rest positions where the exposure time and exposure aperture are at an extreme value; manually operable differential means cooperating with said rings for turning the latter to set the exposure time and exposure aperture, said differential means also having a rest position; means cooperating with said pair of rings and said differential means for automatically returning said pair of rings and said differential means to said rest positions thereof after each exposure; light-sensitive means cooperating with said differential means for controlling the extent of operation thereof; a pair of stop rings also turnably carried by said objective, said stop rings respectively cooperating with said exposure time and exposure aperture rings for controlling the movement of the latter by said differential means; and manually operable turning means cooperating with said stop rings for simultaneously turning the latter in opposite directions in response to actuation of said manually operable turning means so that only a selected one of said stop rings cooperates with a selected one of said exposure time and exposure aperture setting rings to prevent movement at least over a predetermined range of the selected ring from said rest position thereof so that the factor set by the other ring will have its value changed upon actuation of said differential means.

4. In a camera, in combination, objective means; a pair of setting rings turnably carried by said objective means for setting the exposure time and exposure aperture, respectively; differential means cooperating with said setting rings for actuating the latter to set the exposure time and exposure aperture; light-sensitive means cooperating with said differential means for controlling the extent of operation thereof; a pair of gear sectors turnably carried by said objective means, said gear sectors respectively having teeth arranged concentrically and spaced radially from and directed toward each other; a pinion common to said sectors located between and meshing therewith; a pair of stop portions respectively connected with said gear sectors and cooperating stop portions respectively carried by said setting rings, said pinion upon being turned moving said gear sectors simultaneously in opposite directions for placing one or the other of the stop portions connected with said gear sectors in operating relation with respect to one or the other of the stop portions of said rings so that a selected one of said setting rings can be maintained stationary at least over a predetermined range while said differential means is actuated to move the other of said setting rings to change the exposure factor controlled thereby; and manually operable means cooperating with said pinion for rotating the latter so as to turn said sectors and the stop portions connected thereto, respectively.

5. In a camera, in combination, a camera housing having an upper portion; an objective carried by said housing below said upper portion thereof; a pair of setting rings to be carried by said objective for respectively setting the exposure time and exposure aperture of the camera; differential means cooperating with said setting rings for turning the latter to set the exposure time and exposure aperture, respectively; light-sensitive means cooperating with said differential means for controlling the extent of operation thereof; a pair of gear sectors turnably carried by said objective, said gear sectors respectively having concentric teeth spaced from and directed toward each other; a pinion located between and meshing with said teeth of said gear sectors; a first bevel gear connected coaxially to said pinion to rotate therewith; a second bevel gear normal to and meshing with said first bevel gear; an elongated member extending along the axis of said bevel gear, fixed to the latter, and having an upper end located at said upper portion of said housing, said upper end of said elongated member being accessible to the operator so that the operator can turn said elongated portion and said second bevel gear therewith in order to transmit turning movement from said second to said first bevel gear to said pinion in order to simultaneously turn said gear sectors in opposite directions; and stop means cooperating with said setting rings and said gear sectors for selectively stopping the turning of one of said rings at least over a predetermined range while said differential means turn the other of said rings until said other ring has turned through the entire range of movement thereof.

6. In a camera, in combination, a camera housing having an upper portion; an objective carried by said housing below said upper portion thereof; a pair of setting rings to be carried by said objective for respectively setting the exposure time and exposure aperture of the camera; differential means cooperating with said setting rings for turning the latter to set the exposure time and exposure aperture, respectively; light-sensitive means cooperating with said differential means for controlling the extent of operation thereof; a pair of gear sectors turnably carried by said objective, said gear sectors respectively having concentric teeth spaced from and directed toward each other; a pinion located between and meshing with said teeth of said gear sectors; a first bevel gear connected coaxially to said pinion to rotate therewith; a second bevel gear normal to and meshing with said first bevel gear; an elongated member extending along the axis of said bevel gear, fixed to the latter, and having an upper end located at said upper portion of said housing, said upper end of said elongated member being accessible to the operator so that the operator can turn said elongated portion and said second bevel gear therewith in order to transmit turning movement from said second to said first bevel gear to said pinion in order to simultaneously turn said gear sectors in opposite directions; and stop means cooperating with said setting rings and said gear sectors for selectively stopping the turning of one of said rings at least over a predetermined range while said differential means turn the other of said rings until said other ring has turned through the entire range of movement thereof, said elongated member being hollow and an elongated shutter release plunger extending axially through said hollow member.

7. In a camera, in combination, shutter release means; an objective; a pair of setting rings turnably carried by said objective for setting the exposure time and the exposure aperture, respectively; differential means cooperating with said pair of setting rings for turning the latter; manually operable means cooperating with said differential means for actuating the latter; light-sensitive means cooperating with said manually operable means for controlling the extent to which said differential means is actuated by said manually operable means; and blocking means cooperating with said manually operable means for blocking operation of said shutter release means until said differential means has been actuated and moved to its final position by said manually operable means so that the shutter will not be actuated until said setting rings have been set.

8. In a camera, in combination, an objective; a pair of setting rings turnably carried by said objective for respectively setting the exposure time and the exposure aperture, said setting rings respectively having rest positions where said exposure time and exposure aperture are at an extreme value; differential means cooperating with said setting rings for turning the latter to set the exposure time and the exposure aperture of the camera; manually operable means cooperating with said differential means for actuating the latter, said manually operable means including a projection movable along a predetermined path; light-sensitive means cooperating with said manually operable means for controlling the extent to which said differential means is actuated by said manually operable means; a shutter operating member movable along a second path; a blocking member located along said second path for preventing operation of said shutter operating member when said blocking member is in a blocking position; and linkage means connected to said blocking member and having a portion located in the path of movement of said projection of said manually operable means to be actuated by said projection of said manually operable means when the latter is operated to actuate said differential means for acting through said linkage on said blocking means to remove the latter from said blocking position thereof so as to free said shutter operating member for operation to actuate the shutter only after the differential means has been actuated to set said rings.

9. In a camera, in combination, an objective; a pair of setting rings turnably carried by said objective for respectively setting the exposure time and exposure aperture, said setting rings respectively having rest positions where said exposure time and exposure aperture are at an extreme value; differential means cooperating with said rings for turning the latter; manually operable selecting means cooperating with said rings for selectively operating the latter with said differential means in a manner maintaining one of said rings at least over a predetermined range stationary while the other of said rings is moved through its entire range of movement and for then operating said one ring through said differential means; manually operable actuating means operatively connected with said differential means for actuating the latter; light-sensitive control means cooperating with said manually operable actuating means for controlling the extent of operation of the latter and thus controlling the extent of operation of said differential means so as to set a proper combination of exposure time and exposure aperture into the camera, said selecting means being operable even after actuation of said manually operable actuating means to change the combination of exposure time and exposure aperture.

10. In a camera, in combination, an objective; a pair of setting rings turnably carried by said objective for respectively setting the exposure time and exposure aperture, said setting rings respectively having rest positions where said exposure time and exposure aperture are at an extreme value; differential means cooperating with said rings for turning the latter; manually operable selecting means cooperating with said rings for selectively operating the latter with said differential means in a manner maintaining one of said rings at least over a predetermined range stationary while the other of said rings is moved through its entire range of movement and for then operating said one ring through said differential means; manually operable means operatively connected with said differential means for actuating the latter; light-sensitive control means cooperating with said manually operable means for controlling the extent of operation of the latter and thus controlling the extent of operation of said differential means so as to set a proper combination of exposure time and exposure aperture into the camera, said selecting means being operable even after actuation of said manually operable means to change the combination of exposure time and exposure aperture; and pawl means cooperating with said manually operable means for maintaining the latter in the position to which it has been moved in order to actuate the differential means so that while said manually operable means is thus maintained the operator can manipulate the selecting means to change the combination of exposure time and exposure aperture as desired.

11. In a camera, in combination, an objective; a pair of setting rings turnably carried by said objective for respectively setting the exposure time and exposure aperture, said setting rings respectively having rest positions where said exposure time and exposure aperture are at an extreme value; differential means cooperating with said rings for turning the latter; manually operable selecting means cooperating with said rings for selectively operating the latter with said differential means in a manner maintaining one of said rings at least over a predetermined range stationary while the other of said rings is moved through its entire range of movement and for then operating said one ring through said differential means; manually operable means operatively connected with said differential means for actuating the latter; light-sensitive control means cooperating with said manually operable means for controlling the extent of operation of the latter and thus controlling the extent of operation of said differential means so as to set a proper combination of exposure time and exposure aperture into the camera, said selecting means being operable even after actuation of said manually operable means to change the combination of exposure time and exposure aperture; pawl means cooperating with said manually operable means for maintaining the latter in the position to which it has been moved in order to actuate the differential means so that while said manually operable means is thus maintained the operator can manipulate the selecting means to change the combination of exposure time and exposure aperture as desired; and shutter actuating means cooperating with said pawl means for actuating the latter to release said manually operable means upon actuation of said shutter actuating means.

12. In a camera, in combination, manually operable means movable along a given path for setting the exposure time and exposure aperture of the camera, said manually operable means including a manually engageable member moving along said path and having a tooth; light-sensitive means cooperating with said manually operable means for controlling the extent of operation thereof; an elongated pawl cooperating with said tooth for retaining said manually operable means in the position to which it is moved by the operator, said pawl having a free end distant from said tooth; and a shutter actuating member movable along a path in which said free end of said pawl is located so that when said shutter actuating member is actuated the pawl will be turned out of engagement with said tooth to release said manually operable means upon actuation of the shuter.

13. In a camera, in combination, an objective; a pair of setting rings turnably carried by said objective for respectively setting the exposure time and the exposure aperature, said rings respectively having peripheral portions in a common plane spaced from and directed toward each other, and said peripheral portions being respectively formed with teeth; a pinion meshing with said teeth; a manually operable member movable along a predetermined path and carrying said pinion; and means operating in response to light received by the camera for controlling said manually operable member to determine the extent to which the latter is moved by the operator so as to determine the extent of the turning of said pinion with respect to the teeth of said rings.

14. In a camera, in combination, an objective; a pair of setting rings turnably carried by said objective for respectively setting the exposure time and the exposure aperture, said rings respectively having peripheral portions located in a common plane and spaced from and directed toward each other and said peripheral portions being formed with teeth; a pinion located between said peripheral portions of said rings and meshing with said teeth thereof; a ring turnably carried by said objective and having a lever extending radially therefrom, said lever turnably carrying said pinion and having an outer free end formed with a slot; an elongated shaft extending perpendicularly to the optical axis and supported for axial movement, said shaft being manually movable along its axis and said shaft fixedly carrying a projection which is located in said slot of said lever so that when said shaft is actuated by the operator said lever will turn to move said pinion with respect to said rings; light-sensitive control means cooperating with said shaft for determining the extent of movement of the latter in accordance with the lighting conditions, so that the angle through which said lever turns is determined by the lighting conditions; and means cooperating with said ring for selectively preventing at least over a predetermined range the movement of one of said rings while the other of said rings is moved upon turning of said lever when said shaft moves axially, said means for selectively preventing movement of a selected one of said rings yielding to permit movement of said one ring after the other of said rings has been moved through its entire range.

15. In a camera, in combination, an objective; a pair of setting rings turnably carried by said objective for respectively setting the exposure time and exposure aperture, said rings respectively having arcuate portions located in a common plane and spaced from each other; a third ring turnably carried by said objective and having a portion located between said arcuate portions of said setting rings; a lever turnably carried intermediate its ends by said portion of said third ring, said lever having end portions respectively overlapping said arcuate portions of said setting rings; pin-and-slot means connecting said free end portions of said lever with said setting rings, respectively, so that when one of said setting rings is maintained stationary while said third ring turns said lever will move the other of said setting rings; manually operable means cooperating with said third ring for turning the latter; and light-sensitive means cooperating with said manually operable means for controlling the extent of operation thereof.

16. In a camera, in combination, an objective; a pair of setting rings turnably carried by said objective respectively setting the exposure time and the exposure aperture; differential means cooperating with said setting rings for turning the latter; light-sensitive means cooperating with said differential means for controlling the extent of operation thereof; a pair of stop means respectively cooperating with said rings for determining the range through which said rings are capable of turning so as to determine the maximum and minimum values set by said rings; and manually operable means cooperating with said rings for selectively preventing at least over a predetermined range movement of a selected one of said rings until said differential means has moved the other of said rings through its entire range of movement, said manually operable means including a pair of stop members and a pair of stop portions respectively forming parts of said rings and cooperating with said stop members, each stop member and the stop portion cooperating therewith having a maximum angular displacement with respect to each other equal to the sum of the entire range of movement of both of said rings provided by said stop means.

17. In a camera, in combination, an objective; a pair of setting rings rotatably carried by said objective for respectively setting the exposure time and the exposure aperture; manually operable differential means cooperating with said rings for turning the latter, said rings respectively having rest positions where they set an extreme value of exposure time and exposure aperture into the camera and said differential means also having a rest position; automatic means requiring said setting rings and said differential means to said rest positions thereof after each exposure; control means responsive to lighting conditions cooperating with said manually operable differential means for determining the extent of movement thereof in accordance with the lighting conditions; a pair of stop means respectively cooperating with said rings for preventing turning thereof by said differential means; manually operable selecting means cooperating with said pair of stop means for selectively placing one or the other of said stop means in an operating position stopping a selected one of said rings from turning movement; and brake means holding said manually operable selecting means in the position in which it is set by the operator, so that when said differential means has moved that one of said rings which is not stopped by the selected stop means through its entire range of movement said differential means can then move the other of said rings in opposition to the force of said brake means.

18. In a camera, in combination, an objective; a pair of setting rings rotatably carried by said objective for respectively setting the exposure time and the exposure aperture; manually operable differential means cooperating with said rings for turning the latter, said rings respectively having rest positions where they set an extreme value of exposure time and exposure aperture into the camera and said differential having a rest position; automatic means returning said rings and said differential means automatically to said rest positions thereof after each exposure; control means responsive to lighting conditions cooperating with said manually operable differential means for determining the extent of movement thereof in accordance with the lighting conditions; a pair of stop means respectively cooperating with said rings for preventing turning thereof by said differential means; manually operable selecting means cooperating with said pair of stop means for selectively placing one or the other of said stop means in an operating position stopping a selected one of said rings from turning movement; brake means holding said manually operable selecting means in the position in which it is set by the operator, so that when said differential means has moved that one of said rings which is not stopped by the selected stop means through its entire range of movement said differential means can then move the other of said rings in opposition to the force of said brake means; and indicator means cooperating with said manually operable selecting means for indicating whether a selection is made for a quickly moving subject or for a large depth of field sharpness.

19. In a camera, in combination, objective means; an exposure time setting ring turnably carried by said objective means and having a rest position where the exposure time is at a maximum; an aperture setting ring turnably carried by said objective means and having a rest position where the aperture is at a maximum; differential means cooperating with said rings for turning the latter to set the exposure time and aperture of the camera, said differential means also having a rest position; means cooperating with said setting rings and said differential means for automatically returning said rings and said differential means to said rest positions thereof after each exposure; light-sensitive means cooperating with said differential means for controlling the extent of operation thereof; and manually operable means cooperating with said rings for selectively preventing movement of one of said rings at least over a predetermined range until the other of said rings has been moved from its rest position by said differential means through its entire range of movement.

20. In a camera, in combination, objective means; an exposure time setting ring turnably carried by said objective means and having a rest position where the exposure time is at a minimum; an aperture setting ring turnably carried by said objective means and having a rest position where the aperture is at a minimum; differential means cooperating with said rings for turning the latter to set the exposure time and aperture of the camera, said differential means also having a rest position; automatic means automatically returning said setting rings and said differential means to said rest positions thereof after each exposure; light-sensitive means cooperating with said differential means for controlling the extent of the operation thereof; and manually operable means cooperating with said rings for selectively preventing movement of one of said rings at least over a predetermined range until the other of said rings has been moved from its rest position by said differential means through its entire range of movement.

21. In a camera, in combination, a pair of rotary means for respectively setting the exposure time and the exposure aperture of the camera; manually operable differential means cooperating with said pair of rotary means for turning the latter to set the exposure time and exposure aperture; light-sensitive means cooperating with said differential means for controlling the extent of operation thereof in accordance with the lighting conditions, so that the combination of exposure time and exposure aperture provided by said pair of rotary means will give a proper exposure; and manually operable selecting means cooperating with said pair of rotary means to select the position of one of said pair of rotary means so as to provide a selected combination of exposure time and exposure aperture, said selecting means being operable after actuation of said differential means for changing the position of a selected one of said rotary means, said selected one of said rotary means upon being moved by said selecting means acting through said differential means on the other of said rotary means to provide automatically a combination of exposure time and exposure aperture which will give a proper exposure in accordance with the lighting conditions.

22. In a camera, in combination, objective means; a pair of setting rings turnably carried by said objective means for setting exposure time and exposure apertures, respectively, both of said rings respectively having first stop portions and respectively having rest positions where said exposure time and exposure aperture are at an extreme value; differential means cooperating with said setting rings for actuating the latter to set the exposure time and exposure aperture; light-sensitive means cooperating with said differential means for controlling the extent of operation thereof in accordance with the lighting conditions; manually operable selecting means; drive means actuated by said selecting means; a pair of second stop portions respectively connected with said drive means to be driven thereby and cooperating with said first stop portions, said drive means upon being actuated by said selecting means simultaneously moving said pair of second stop portions in opposite directions for placing one or the other of said second stop portions in an operative position with respect to one or the other of said first stop portions, so that selected one of said setting rings can be maintained stationary at said rest position thereof while said differential means is actuated to move the other of said setting rings to change the exposure factor controlled thereby.

References Cited in the file of this patent
UNITED STATES PATENTS

| | | |
|---|---|---|
| 1,987,765 | Wandersleb | Jan. 15, 1935 |
| 2,342,819 | Priesemann | Feb. 29, 1944 |
| 2,868,095 | Gebele | Jan. 13, 1959 |
| 2,913,969 | Faulhaber | Nov. 24, 1959 |
| 2,923,216 | Greger | Feb. 2, 1960 |
| 2,926,589 | Gebele | Mar. 1, 1960 |
| 2,926,590 | Sato | Mar. 1, 1960 |